United States Patent
Ono (10) Patent No.: US 8,508,613 B2
(45) Date of Patent: Aug. 13, 2013

(54) IMAGE CAPTURING APPARATUS

(75) Inventor: Shuji Ono, Saitama (JP)

(73) Assignee: Fujifilm Corporation, Tokyo (JP)

(*) Notice: Subject to any disclaimer, the term of this patent is extended or adjusted under 35 U.S.C. 154(b) by 131 days.

(21) Appl. No.: 13/016,068

(22) Filed: Jan. 28, 2011

(65) Prior Publication Data

US 2011/0234833 A1 Sep. 29, 2011

(30) Foreign Application Priority Data

Mar. 29, 2010 (JP) ................................. 2010-074417
Oct. 13, 2010 (JP) ................................. 2010-230315

(51) Int. Cl.
*H04N 5/235* (2006.01)

(52) U.S. Cl.
USPC ........................................ 348/222.1; 382/254

(58) Field of Classification Search
USPC .............. 348/221.1, 241, 249, 255, 275, 282, 348/348
See application file for complete search history.

(56) References Cited

U.S. PATENT DOCUMENTS

| | | | | |
|---|---|---|---|---|
| 5,307,175 A | * | 4/1994 | Seachman | 358/401 |
| 7,636,473 B2 | * | 12/2009 | Imai et al. | 382/167 |
| 2009/0297056 A1 | * | 12/2009 | Lelescu et al. | 382/261 |
| 2010/0079626 A1 | * | 4/2010 | Hatakeyama | 348/241 |

FOREIGN PATENT DOCUMENTS

JP 2008-017536 1/2008

OTHER PUBLICATIONS

Edward R. Dowski Jr. et al—Extended depth of field through wave front coding—vol. 34, No. 11-Apr. 10, 1995—pp. 1859-1866.

* cited by examiner

*Primary Examiner* — Tuan Ho
*Assistant Examiner* — Zhenzhen Wu
(74) *Attorney, Agent, or Firm* — Young & Thompson (57) ABSTRACT

An image capturing apparatus that effectively extends a depth of field of an imaging unit by performing restoration processing on image data obtained by imaging a subject with the imaging unit, in which image data (A/D converted digital image signal) are corrected by a linear correction unit such that an input light versus output signal value characteristic of the image sensor becomes linear and the restoration processing for depth of field extension is performed on the linear corrected image data.

6 Claims, 8 Drawing Sheets

FIG.1

FIG.2A IMAGED LIGHT INTENSITY DISTRIBUTION OF IMAGING OPTICAL SYSTEM

FIG.2B IMAGE DATA OBTAINED BY NON-LINEAR IMAGE SENSOR

FIG.2C LINEAR CORRECTED IMAGE DATA

FIG.2D CORRECTION CHARACTERISTIC OF RESTORATION FILTER

FIG.2E RESTORED IMAGE DATA

FIG.3A

IMAGED LIGHT INTENSITY DISTRIBUTION OF IMAGING OPTICAL SYSTEM

FIG.3B

IMAGE DATA OBTAINED BY NON-LINEAR IMAGE SENSOR

FIG.3C

LINEAR CORRECTED IMAGE DATA

FIG.3D

CORRECTION CHARACTERISTIC OF RESTORATION FILTER

FIG.3E

RESTORED IMAGE DATA

SUBJECT (EDGE IMAGE) LIGHT INTENSITY DISTRIBUTION

FIG.5B PRIOR ART

IMAGED LIGHT INTENSITY DISTRIBUTION OF IMAGING OPTICAL SYSTEM

FIG.5C PRIOR ART

IMAGE DATA OBTAINED BY LINEAR IMAGE SENSOR

FIG.5D PRIOR ART

CORRECTION CHARACTERISTIC OF RESTORATION FILTER

FIG.5E PRIOR ART

RESTORED IMAGE DATA

FIG.6 PRIOR ART

FIG.7A PRIOR ART — IMAGED LIGHT INTENSITY DISTRIBUTION OF IMAGING OPTICAL SYSTEM

FIG.7B PRIOR ART — IMAGE DATA OBTAINED BY NON-LINEAR IMAGE SENSOR

FIG.7C PRIOR ART — CORRECTION CHARACTERISTIC OF RESTORATION FILTER

FIG.7D PRIOR ART — RESTORED IMAGE DATA

FIG.8A PRIOR ART — IMAGED LIGHT INTENSITY DISTRIBUTION OF IMAGING OPTICAL SYSTEM

FIG.8B PRIOR ART — IMAGE DATA OBTAINED BY NON-LINEAR IMAGE SENSOR

FIG.8C PRIOR ART — CORRECTION CHARACTERISTIC OF RESTORATION FILTER

FIG.8D PRIOR ART — RESTORED IMAGE DATA

Image Capturing Apparatus

BACKGROUND OF THE INVENTION

1. Field of the Invention

The present invention relates to an image capturing apparatus that effectively extends a depth of field of an imaging means by performing restoration processing on image data obtained by imaging a subject with the imaging means.

2. Description of the Related Art

An EDoF (extended depth of field) function has been proposed as described, for example, in a literature "Extended depth of field through wave-front coding", E. R. Dowski, Jr. and W. T. Cathey, Appl. Opt., Vol. 34, No. 11, pp. 1859-1866, 1995. The EDoF function allows acquisition of an image in which a certain range from the focus position is in focus by providing an optical filter for keeping the optical transfer function of the lens optical system constant at a position where the image sensor is disposed over a certain predetermined range of object distances in an optical axis direction so that the optical transfer function of the lens optical system becomes essentially constant within a certain range from the focus position and passing image data obtained by imaging through a restoration filter having a reverse characteristic to a blur characteristic of the imaging optical system. The EDoF function will now be described in detail. FIGS. 4A to 4E illustrate EDoF processing (when the subject is a point image), FIGS. 5A to 5E illustrate EDoF processing (when the subject is an edge image), FIG. 6 illustrates an example characteristic of input light intensity versus output signal value of an image sensor, FIGS. 7A to 7D illustrate EDoF processing with a general image sensor (when the subject is a point image), and FIGS. 8A to 8D illustrate EDoF processing with a general image sensor (when the subject is an edge image).

Figure 4A:
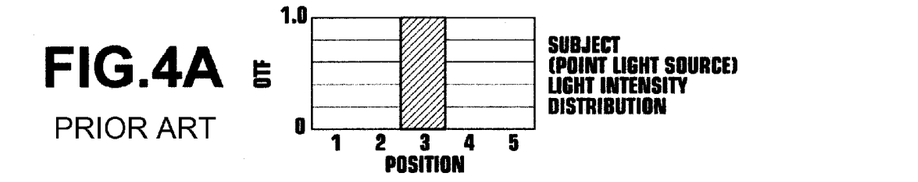
FIGS. 4A to 4E illustrate EDoF processing (when the subject is a point image).
Figure 4B:
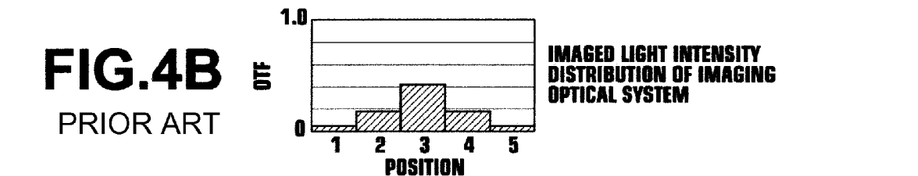
Figure 4C:
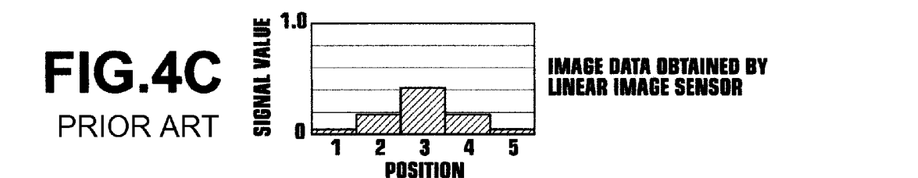

When a point image like that shown in FIG. 4A is captured by an image capturing apparatus having an EDoF function, the point image is scattered at a position where the image sensor is disposed according to a blur characteristic of the imaging optical system as shown in FIG. 4B. The image sensor of the image capturing apparatus obtains image data of the point image by capturing the scattered point image as shown in FIG. 4C.

Figure 4D:
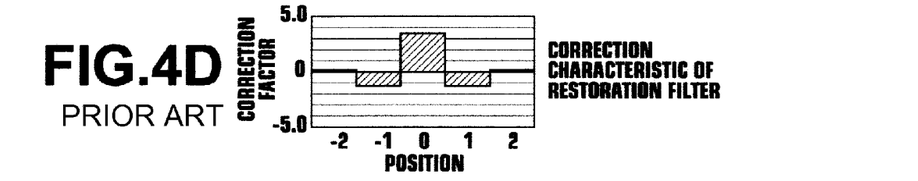
Figure 4E:
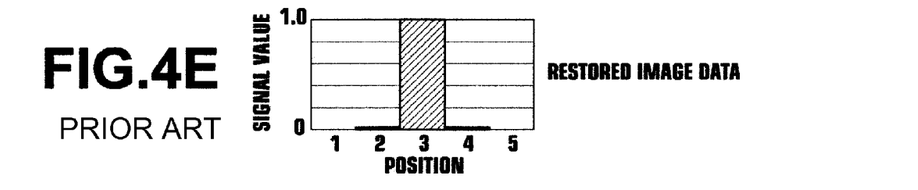

Then, the image data are passed through a restoration filter having a reverse characteristic to the blur characteristic of the imaging optical system as shown in FIG. 4D, whereby image data extremely close to the original point image may be obtained as shown in FIG. 4E.

Figure 5A:
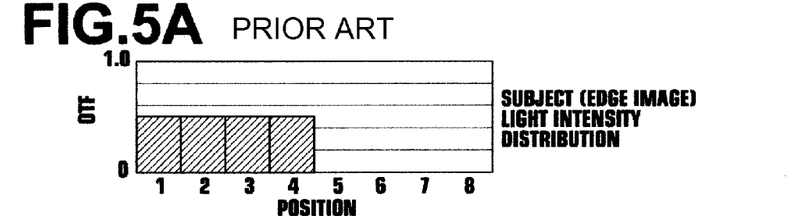
FIGS. 5A to 5E illustrate EDoF processing (when the subject is an edge image).
Figure 5B:
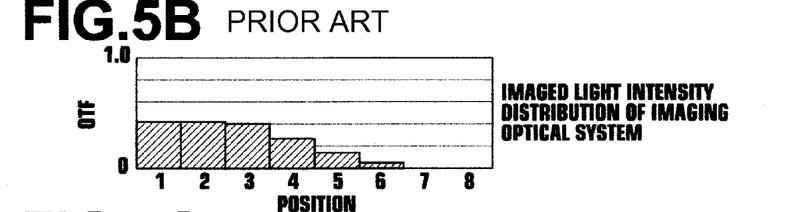
Figure 5C:
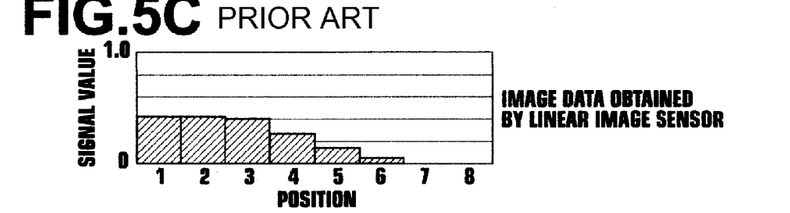
Figure 6:
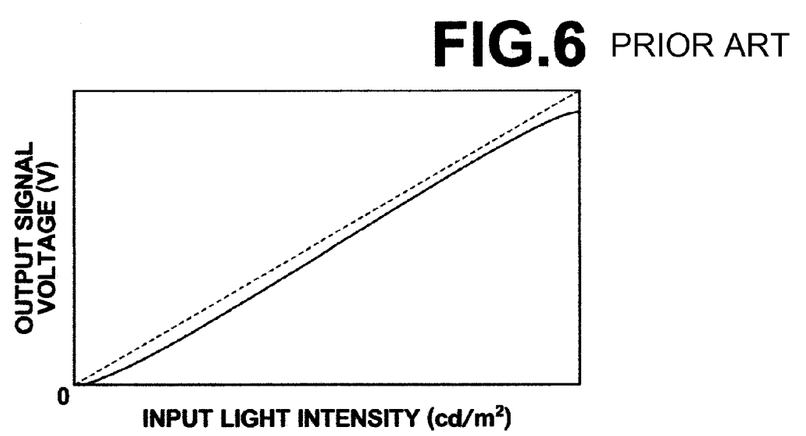
FIG. 6 illustrates an example input light intensity versus output signal value characteristic of an image sensor.

Likewise, when an edge image like that shown in FIG. 5A is captured, the edge image is scattered at a position where the image sensor is disposed according to a blur characteristic of the imaging optical system as shown in FIG. 5B. The image sensor of the image capturing apparatus obtains image data of the edge image by capturing the scattered edge image as shown in FIG. 5C.

Figure 5D:
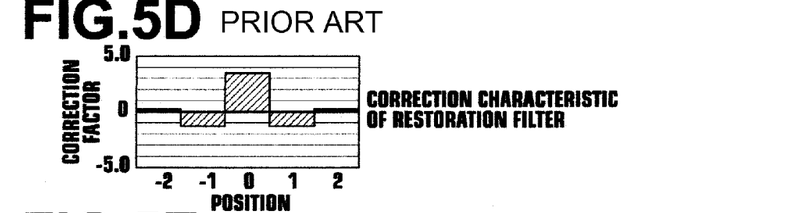
Figure 5E:
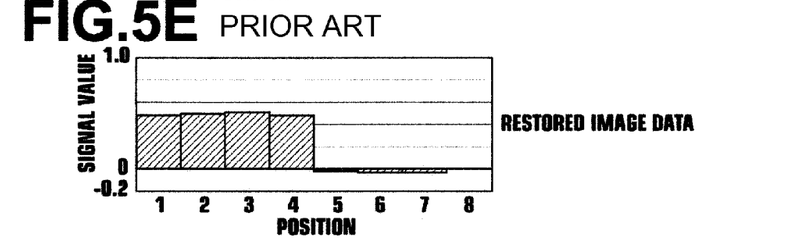

Then, the image data are passed through a restoration filter having a reverse characteristic to the blur characteristic of the imaging optical system as shown in FIG. 5D, whereby image data extremely close to the original edge image may be obtained as shown in FIG. 5E.

The above description is based on the assumption that an ideal image sensor having a linear input light intensity versus output signal value characteristic (photoelectric conversion characteristic) is used and therefore the image data (FIGS. 4C and 5C) accurately reflect the blur characteristic of the imaging optical system (FIGS. 4B and 5B).

Recently, however, a logarithmic characteristic and a double linear characteristic having a steep characteristic in a low sensitivity area (as described, for example, Japanese Unexamined Patent Publication No. 2008-017536) have been proposed as the photoelectric conversion characteristic in order to increase the dynamic range of image sensors. Further, it is extremely rare even for general image sensors without having such arrangements to have a perfectly linear characteristic over the entire range as illustrated by the solid line in FIG. 6, although an attempt has been made to realize a substantially linear characteristic over a wide range.

Figure 7A:
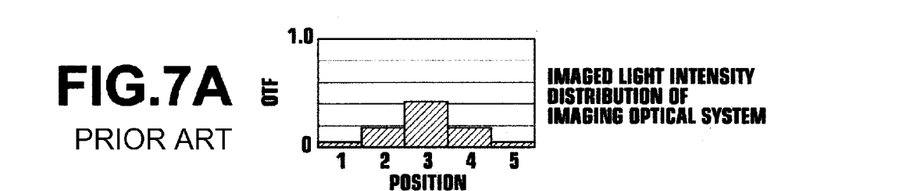
FIGS. 7A to 7D illustrate EDoF processing with a general image sensor (when the subject is a point image).
Figure 7B:
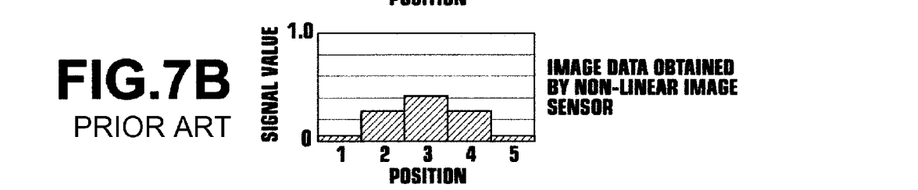
Figure 7C:
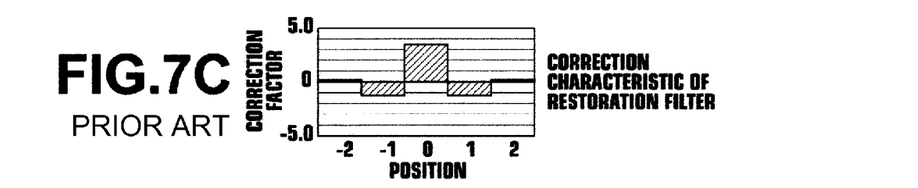
Figure 7D:
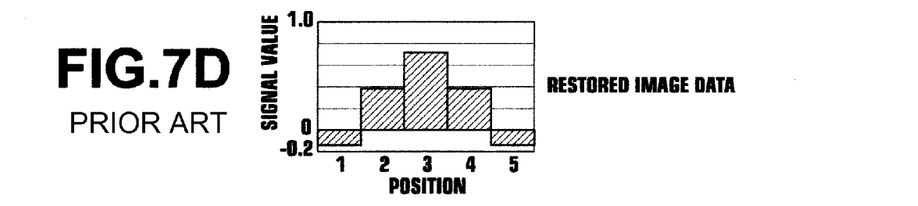

When a point image like that shown in FIG. 4A is captured by an image capturing apparatus having a non-linear photoelectric conversion characteristic as described above, the blur characteristic of the imaging optical system (FIG. 7A) and the signal intensity distribution of image data obtained by the image sensor (FIG. 7B) are different. The restoration filter used for the EDoF processing (FIG. 7C) is designed to have a reverse characteristic to the blur characteristic of the imaging optical system. Therefore, as shown in FIG. 7D, if the blur characteristic of the imaging optical system and the signal intensity distribution of image data obtained by the image sensor are different as described above, an error occurs in which an image signal value representing the point image becomes smaller than the true value (undershoot) even if the image data are passed through the restoration filter, causing a problem that the captured image differs from the original point image.

Figure 8A:
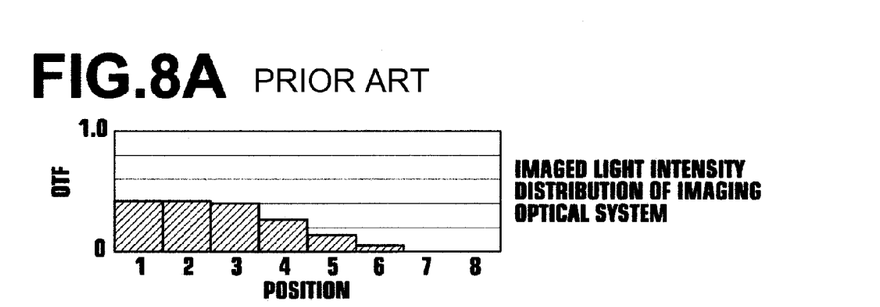
FIGS. 8A to 8D illustrate EDoF processing with a general image sensor (when the subject is an edge image).
Figure 8B:
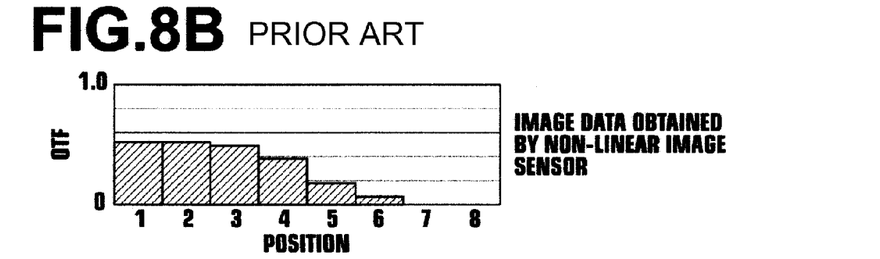
Figure 8C:
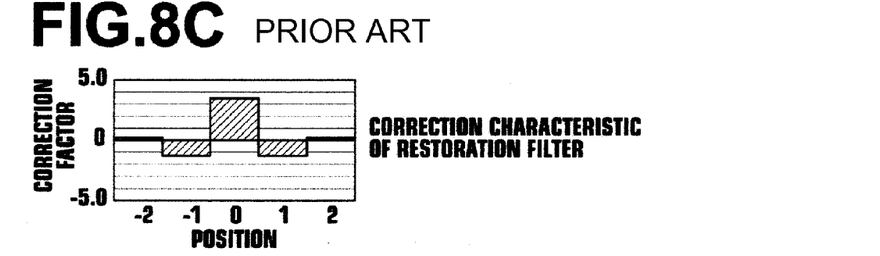
Figure 8D:
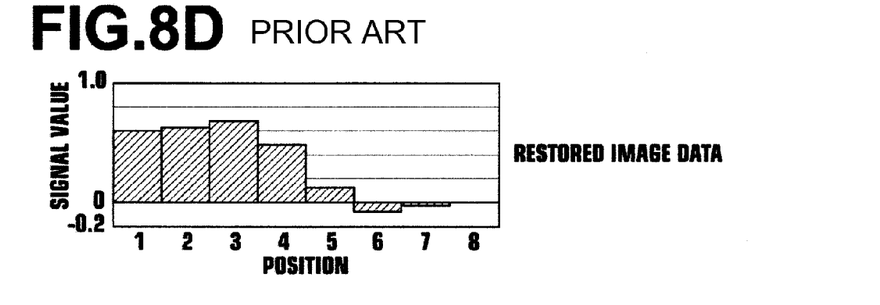

Likewise, when an edge image like that shown in FIG. 5A is captured, the blur characteristic of the imaging optical system (FIG. 8A) and the signal intensity distribution of image data obtained by the image sensor (FIG. 8B) are different. The restoration filter used for the EDoF processing (FIG. 8C) is designed to have a reverse characteristic to the blur characteristic of the imaging optical system. Therefore, as shown in FIG. 8D, if the blur characteristic of the imaging optical system and the signal intensity distribution of image data obtained by the image sensor are different as described above, an error occurs in which an image signal value becomes larger than the true value (overshoot) in the upper side (left side in FIG. 8D) of the edge image and an image signal value becomes smaller than the true value (undershoot) in the lower side (right side in FIG. 8D) of the edge image even if the image data are passed through the restoration filter, causing a problem that the captured image differs from the original edge image.

It is, of course, not always the case that the error mode will become like that described above due to the difference in blur characteristic of the imaging optical system and photoelectric conversion characteristic of the image sensor. In any case, the use of an image sensor having a non-linear photoelectric conversion characteristic, as described above, will cause an error in the restored image.

Here, the description has been made of a case in which a point image and an edge image are used as the subject, but such phenomenon is not limited to these images and will occur in any type of subject.

In image sensors provided with RGB color filters and capable of obtaining a color image, it is often the case that the non-linear characteristic differs from color to color. Further, in image sensors formed of a plurality of types of image sensors having different photoelectric conversion sensitivity values, it is often the case that the difference in non-linear characteristic occurs between high and low sensitivity image sensors.

The present invention has been developed in view of the circumstances described above, and it is an object of the present invention to provide an image capturing apparatus that effectively extends a depth of field of an imaging means by performing restoration processing on image data obtained by imaging a subject with the imaging means and is capable of obtaining more accurately restored image data even when the imaging is performed using an image sensor having a non-linear photoelectric conversion characteristic.

SUMMARY OF THE INVENTION

An image capturing apparatus of the present invention is an apparatus that effectively extends a depth of field of an imaging means by performing restoration processing on an image signal obtained by imaging a subject with the imaging means, the apparatus including:

an imaging means which includes an imaging optical system for imaging light from a subject and an image sensor for obtaining an image signal by capturing the light imaged by the imaging optical system;

a linear correction means for correcting the image signal such that an input light versus output signal value characteristic of the image sensor becomes linear; and an image processing means for performing the restoration processing on the corrected image signal.

In the image capturing apparatus of the present invention, the imaging means may be a means that includes a plurality of image sensors having different input light versus output signal value characteristics, and the linear correction means may be a means that performs different correction processing on each of the plurality of image sensors. The term "a plurality of image sensors having different input light versus output signal value characteristics" as used herein refers to image sensors having color filters of different colors, image sensors having different sensitivity, or image sensors having color filters of different colors and different sensitivity. The term "a plurality of image sensors" as used herein refers not only to a plurality of separate image sensors having different input light versus output signal characteristics but also one image sensor divided into areas of different pixel characteristics for intended use, such as the areas for R, G, and B colors or areas for high and low sensitivity.

Further, the linear correction means may be a means that corrects a digital signal obtained by A/D converting an analog signal outputted from the image sensor or a means that corrects an analog signal outputted from the image sensor.

According to the image capturing apparatus of the present invention, which is an apparatus that effectively extends a depth of field of an imaging means by performing restoration processing on an image signal obtained by imaging a subject with the imaging means, an imaging means which includes an imaging optical system for imaging light from a subject and an image sensor for obtaining an image signal by capturing the light imaged by the imaging optical system, a linear correction means for correcting the image signal such that an input light versus output signal value characteristic of the image sensor becomes linear, and an image processing means for performing the restoration processing on the corrected image signal are provided, whereby an image signal obtained by the image sensor is corrected so as to accurately reflect a blur characteristic of the optical system and then the restoration processing for depth of field extension is performed on the corrected image signal. This allows an accurately restored image signal to be obtained.

In the image capturing apparatus of the present invention, if the imaging means is a means that includes a plurality of image sensors having different input light versus output signal value characteristics and the linear correction means is a means that performs different correction processing on each of the plurality of image sensors, appropriate correction processing which takes into account a different non-linear characteristic of each image sensor may be performed even when the present invention is applied to, for example, a color imaging, an extended dynamic range imaging, and the like, whereby more accurate restored image signal may be obtained.

Further, if the linear correction means is a means that corrects a digital image signal obtained by A/D converting an analog signal outputted from the image sensor, the correction processing may be performed by an arithmetic circuit, such as a CPU or the like, already existing in the image capturing apparatus, so that the image capturing apparatus of the present invention may be realized without increasing the number of components or parts. Still further, if the linear correction means is a means that corrects an analog signal outputted from the image sensor, image processing in the latter stage is identical to that before, so that the image capturing apparatus of the present invention may be realized without increasing the calculation costs.

DESCRIPTION OF THE PREFERRED EMBODIMENTS

Figure 1:
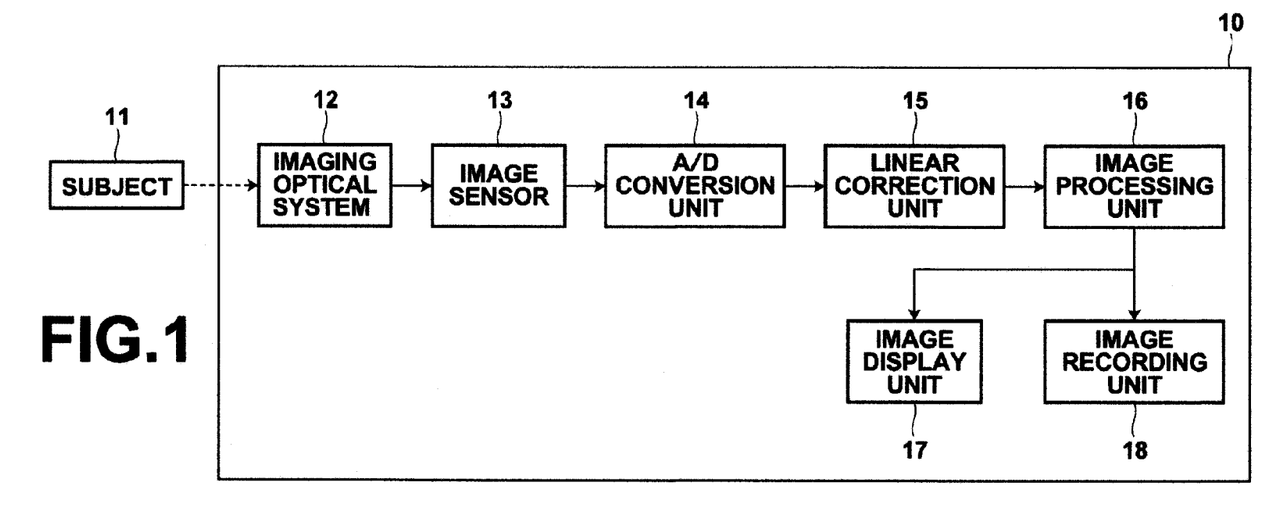
FIG. 1 is a block diagram of an image capturing apparatus according to an embodiment of the present invention, illustrating the configuration thereof.
Figure 2A:
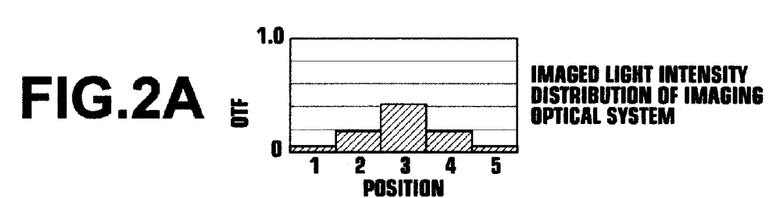
FIGS. 2A to 2E illustrate EDoF processing in the image capturing apparatus described above (when the subject is a point image).
Figure 2B:
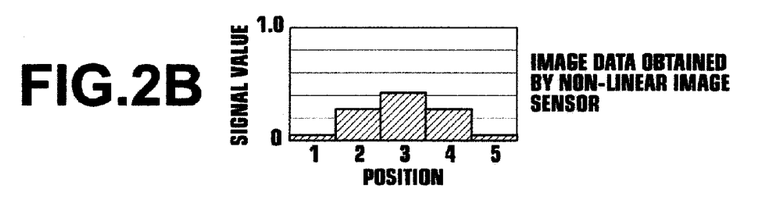
Figure 2C:
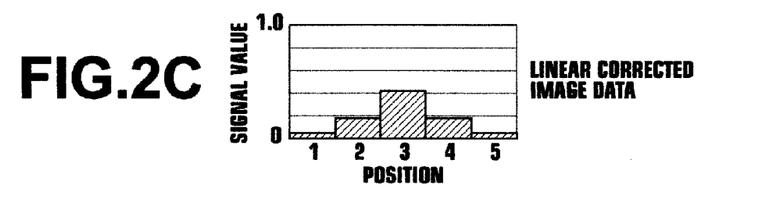
Figure 2D:
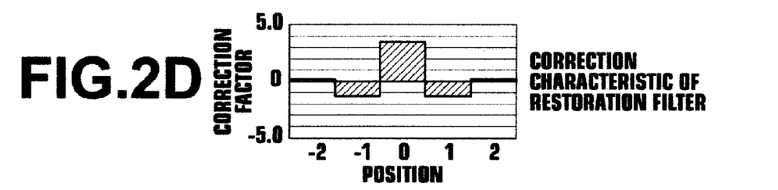
Figure 2E:
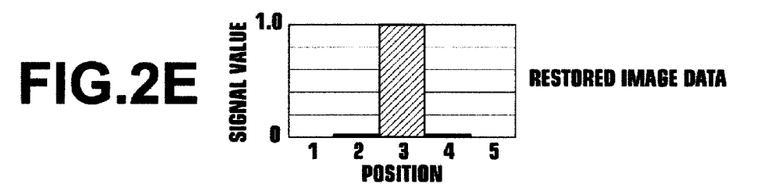
Figure 3A:
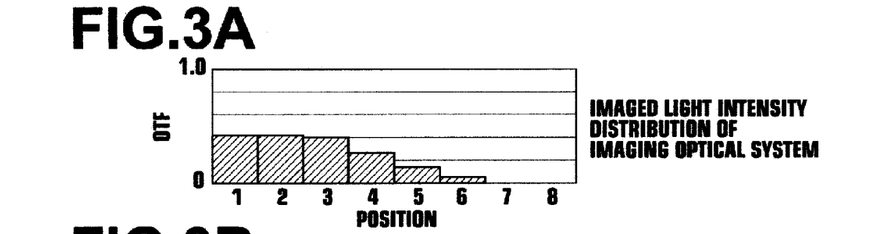
FIGS. 3A to 3E illustrate EDoF processing in the image capturing apparatus described above (when the subject is an edge image).
Figure 3B:
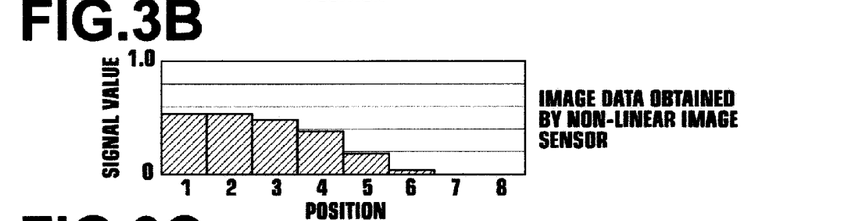
Figure 3C:
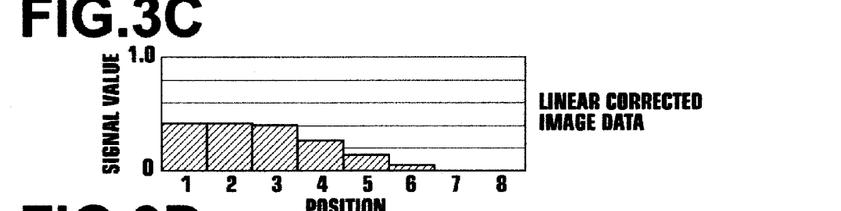
Figure 3D:
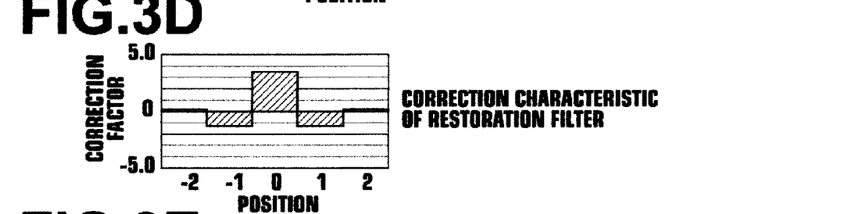
Figure 3E:
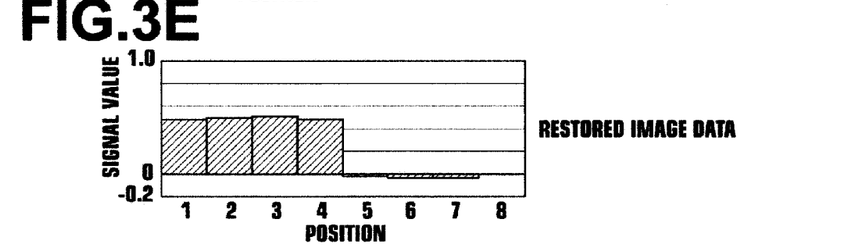

Hereinafter, an embodiment of the present invention will be described in detail with reference to the accompanying drawings. FIG. 1 is a block diagram of an image capturing apparatus according to an embodiment of the present invention, illustrating the configuration thereof.

Image capturing apparatus 10 includes imaging optical system 12 for imaging light from subject 11 on image sensor 13, A/D conversion unit 14 for converting an analog image signal outputted from image sensor 13 to a digital image signal, linear correction unit 15 for correcting image data (A/D converted digital image signal) such that an input light versus output signal value characteristic of image sensor 13 becomes linear, image processing unit 16 for performing restoration processing on the linear corrected image data for depth of field extension, image display unit 17, such as a monitor or the like, for displaying restored image data, and image recording unit 18 for recording the image data on a recording medium.

Imaging optical system 12 includes a lens optical system and an optical filter for keeping the optical transfer function of the lens optical system constant at a position where image sensor 13 is disposed over a certain predetermined range of object distances in an optical axis direction so that the optical transfer function of the lens optical system becomes essentially constant within a certain range from the focus position.

Image sensor 13 is provided with RGB color filters and one pixel is formed of three color pixels. Preferably, image sensor 13 is a solid state image sensor, but there is not any restriction and any type of image sensor may be used. Further, there is not any restriction on the color filters and any type may be used.

The imaging means of the present invention includes imaging optical system 12 and image sensor 13.

Linear correction unit 15 is a unit for correcting image data (A/D converted digital image signal) such that an input light versus output signal value characteristic of image sensor 13 becomes linear. In the correction method employed in the present embodiment, a LUT (lookup table) is provided in which pixel values of image data before and after correction are associated with each other, and the signal value is corrected for each color pixel of the image data. But any other method may be used, such as a method that performs γ processing on the entire image data.

Image processing unit 16 passes the linear corrected image data through a restoration filter having a reverse characteristic to a blur characteristic of the imaging optical system 12 as the restoration processing for depth of field extension. Note that there is not any specific restriction on the contents of the restoration processing, and any method may be used, such as the application of the kernel processing in real space, other than the application of filtering in spatial frequency domain.

An operation of image capturing apparatus 10 configured in the aforementioned manner will now be described with reference to FIGS. 2A to 2E and FIGS. 3A to 3E. Here, the description will be made of a case in which the imaging target is a point image as shown in FIG. 4A.

Imaging of subject 11 (point image) is performed by the imaging means (imaging optical system 12 and image sensor 13), and image data (FIG. 2B) are obtained by converting an analog image signal outputted from image sensor 13 to a digital image signal by A/D conversion unit 14. Note that the image data do not accurately reflect a blur characteristic (FIG. 2A) of imaging optical system 12.

Consequently, in the present embodiment, the image data are separated into each of RGB colors, and signal value correction is performed with respect to each color pixel in linear correction unit 15 with reference to LUT to obtain image data (FIG. 2C) corrected such that an input light versus output signal value characteristic of image sensor 13 becomes linear.

Image processing unit 16 passes the linear corrected image data through a restoration filter having a reverse characteristic (FIG. 2D) to the blur characteristic of imaging optical system 12, whereby image data (FIG. 2E) extremely close to original subject 11 (point image) may be obtained.

The same applies to a case in which the imaging target is an edge image as shown in FIG. 5A.

Imaging of subject 11 (edge image) is performed by the imaging means (imaging optical system 12 and image sensor 13), and image data (FIG. 3B) are obtained by converting an analog image signal outputted from image sensor 13 to a digital image signal by A/D conversion unit 14. Note that the image data do not accurately reflect a blur characteristic (FIG. 3A) of imaging optical system 12.

Consequently, in the present embodiment, the image data are separated into each of RGB colors, and signal value correction is performed with respect to each color pixel in linear correction unit 15 with reference to LUT to obtain image data (FIG. 3C) corrected such that an input light versus output signal value characteristic of image sensor 13 becomes linear.

Image processing unit 16 passes the linear corrected image data through a restoration filter having a reverse characteristic (FIG. 3D) to the blur characteristic of imaging optical system 12, whereby image data (FIG. 3E) extremely close to original subject 11 (edge image) may be obtained.

Here, the description has been made of a case in which a point image and an edge image are used as the subject, but for any type of subject, image data extremely close to the original subject may be obtained by performing the aforementioned processing.

The image data subjected to the restoration processing by the steps described above are displayed on image display unit 17, such as a monitor or the like, or recorded on a recording medium or the like in image recording unit 18.

So far, the image capturing apparatus of the present invention has been described in detail, but the present invention is not limited to the embodiment described above.

For example, the linear correction of the image signal outputted from the image sensor may be performed directly on the analog signal using an analog circuit rather than after being converted to a digital signal as described above.

It should be appreciated that various changes and modifications may be made without departing from the spirit of the present invention.

What is claimed is:

1. An image capturing apparatus that effectively extends a depth of field of an imaging means by performing restoration processing on an image signal obtained by imaging a subject with the imaging means, the apparatus comprising:
   an imaging means which includes an imaging optical system for imaging light from a subject and an image sensor for obtaining an image signal by capturing the light imaged by the imaging optical system;
   a linear correction means for correcting the image signal such that an input light versus output signal value characteristic of the image sensor becomes linear; and
   an image processing means for performing the restoration processing on the corrected image signal, wherein
   the imaging means is a means that includes a plurality of image sensors having different input light versus output signal value characteristics; and
   the linear correction means is a means that performs different correction processing on each of the plurality of image sensors.

2. The image capturing apparatus of claim 1, wherein each of the plurality of image sensors is a sensor that includes a color filter of a different color.

3. The image capturing apparatus of claim 1, wherein each of the plurality of image sensors is a sensor that includes different sensitivity.

4. The image capturing apparatus of claim 2, wherein each of the plurality of image sensors is a sensor that includes different sensitivity.

5. The image capturing apparatus of claim 1, wherein the linear correction means is a means that corrects a digital signal obtained by A/D converting an analog signal outputted from the image sensor.

6. The image capturing apparatus of claim 1, wherein the linear correction means is a means that corrects an analog signal outputted from the image sensor.

* * * * *